United States Patent

[11] 3,630,375

| [72] | Inventor | David H. Hodgkins |
| | | Manchester, Conn. |
| [21] | Appl. No. | 46,213 |
| [22] | Filed | June 15, 1970 |
| [45] | Patented | Dec. 28, 1971 |
| [73] | Assignee | Stanadyne, Inc. |
| | | Wilson, Conn. |

[54] THROWAWAY FILTER CARTRIDGE
4 Claims, 3 Drawing Figs.

[52] U.S. Cl. ..................................... 210/299,
210/435
[51] Int. Cl. .......................................... B01d 29/00
[50] Field of Search ............................................ 210/259,
262, 294, 299, 311, 435

[56] References Cited
UNITED STATES PATENTS

| 2,151,538 | 3/1939 | Swanson | 210/299 X |
| 2,200,795 | 5/1940 | Krieck | 210/311 X |
| 3,105,042 | 9/1963 | Roosa | 210/311 X |

*Primary Examiner*—Reuben Friedman
*Assistant Examiner*—R. W. Burks
*Attorney*—Prutzman, Hayes, Kalb & Chilton ABSTRACT: There is disclosed a throwaway fuel oil filter cartridge suited for vertical mounting having a base wall with three ported abutments. The upper one of the ported abutments communicates with the filter's outlet chamber and the other pair communicates with the filter's enlarged inlet chamber. The enlarged inlet chamber serves as a settling basin and a plenum chamber for incoming fuel, and one of the ports communicating therewith is positioned vertically below the other. The three ported abutments provide a tripod mount for the cartridge and the lower one serves as a drain for water which can be operated while the engine is running and prevents fuel line freezeup by maintaining the level of the water below the inlet passage to the filter.

PATENTED DEC 28 1971 3,630,375

INVENTOR
DAVID H. HODGKINS
BY Prutzman, Hayes, Kalb and Chilton
ATTORNEYS

THROWAWAY FILTER CARTRIDGE

This invention relates to liquid filters and more particularly to a novel throwaway fuel oil filter cartridge suited for filtering liquid fuel.

A principal object of the invention is to provide novel filter cartridge suited for mounting on a supporting base and incorporating a sump for collecting water drained in the fuel. Included in this object is the provision of such a filter cartridge wherein freezing temperatures will not prevent the passage of fuel through the filter.

Another object of this invention is the provision of a novel throwaway filter cartridge for a diesel engine wherein water may be drained from the filter cartridge without disassembly and during engine operation. Included in this object is the provision of a pair of vertically offset ported abutments which communicate with the inlet chamber of the filter cartridge and cooperate with a ported abutment communicating with the outlet chamber of the filter cartridge to provide a tripod mount for the cartridge.

Other objects will be in part obvious and in part pointed out more in detail hereinafter.

The invention accordingly consists in the features of construction, combination of elements and arrangement of parts which will be exemplified in the construction hereafter set forth. In the drawing.

Figure 1:
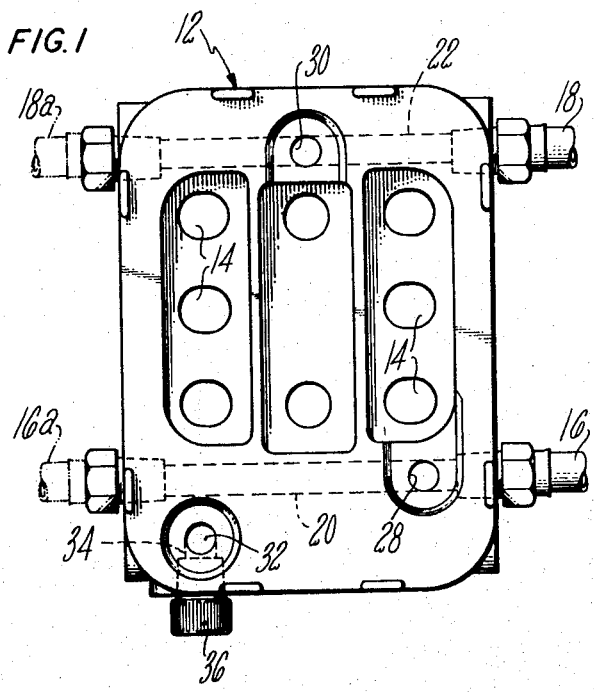
FIG. 1 is a front view of a mounting base for mounting the throwaway filter cartridge of this invention.

The throwaway filter cartridge 10 of this invention is suited for base mounting on a vertically disposed mounting base 12 shown as having a plurality of bolt receiving holes 14 for mounting the base on a supporting structure associated with a diesel engine. The mounting base 12 is provided with a supply conduit 16 for receiving incoming liquid fuel, such as fuel oil, and a discharge conduit 18 for delivering filtered fuel therefrom. As shown, the base is provided with cross bores 20 and 22, one end of each which may be plugged or respectively connected to other conduits 16a, 18a (shown in phantom) for connecting additional filter cartridges in series or in parallel with the filter cartridge 10 mounted on supporting base 12. This arrangement also provides flexibility in that the supply conduit 16 and the discharge conduit 18 may each be connected to either side of the mounting base 12 for flexibility in tubing layout.

An inlet port 28 is provided in the front surface of the mounting base 12 and communicates with the supply conduit 16 through cross bore 20. An outlet port 30 vertically disposed above inlet port 28 is similarly provided in the front face of the supporting base 12 and communicates with the discharge conduit 18 through cross bore 22. A third port 32, disposed vertically below inlet port 28 and laterally thereof, is also provided in the front face of the mounting base 12 but does not communicate with either of the cross bores 20, 22. Port 32 communicates with a downwardly directed passageway 34 in base 12 which is sealed by a threaded plug 36.

Figure 2:
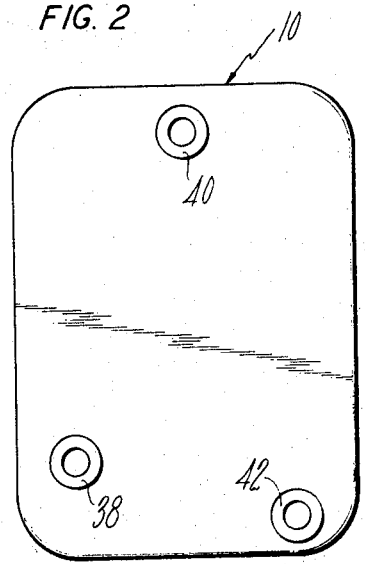
FIG. 2 is a rear view of the filter cartridge of this invention.

As shown in FIG. 2, the throwaway filter cartridge 10 comprises a sealed housing having a base wall 11 provided with laterally and vertically offset bearing portions for the stable lateral and vertical support of the cartridge on the base 12. In the embodiment illustrated, bearing portions take the form of three ported abutments 38, 40, 42 which respectively provide communication between the interior of the filter cartridge and ports 28, 30 and 32 of the mounting base 12.

Where the ported abutments 38, 40 and 42 are formed of a resilient material and are biased against the mounting base 12 by a mounting spring 44, these abutments also serve to seal the filter relative to the base against leakage under the compressive force applied thereon by the spring 44.

Figure 3:
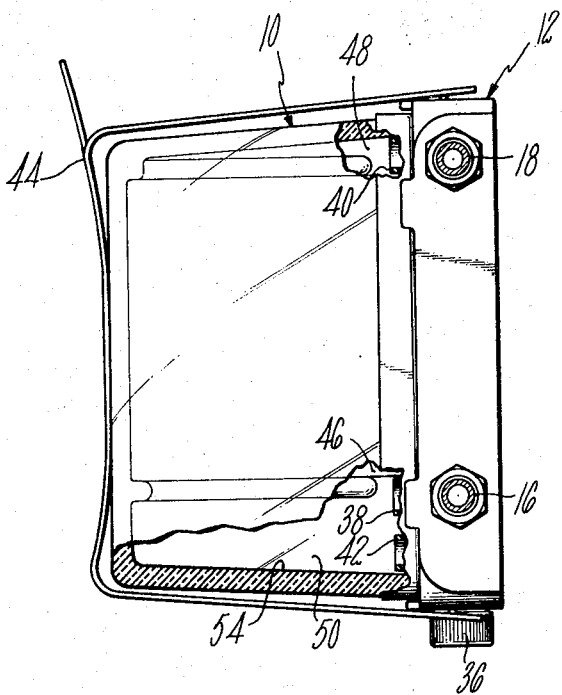
FIG. 3 is a side view, partly broken away, of the filter cartridge of the invention seated on the mounting base.

As shown in FIG. 3, the filter cartridge 10, which is preferably formed of transparent material such as tempered glass for the visual inspection of the interior thereof, is provided with a filter medium 46 which insolates an exit chamber 48 of the filter cartridge from the entrance chamber 50 thereof. The ported abutment 40 communicates with the exit chamber 48 for the passage of filtered fuel to the discharge conduit 18. Similarly, the ported abutment 38 communicates with the entrance chamber 50 for the passage of fuel thereto from the supply conduit 16. Upon entering the filter cartridge 10, fuel oil passes into the entrance chamber 50, upwardly through the filter medium 46, and into the exit chamber 48 from whence it passes to the associated engine through discharge conduit 18.

In the event that the fuel entering through supply conduit 16 contains any water or other impurities of greater specific gravity than the fuel, the enlarged entrance chamber 50 serves as a settling basin with the heavier substances settling to the bottom leaving the contents thereof separated in layers according to specific gravities. Moreover, entrance chamber 50 serves as a plenum chamber so that the flow of fuel in the chamber 50 is quite slow and leaves the heavier water and impurities substantially undisturbed, particularly since the fuel enters the chamber 50 at the upper edge thereof and parallel to the filter element 46 through which it passes.

Since the water and other heavy impurities are collected in the plenum chamber 50 at the bottom thereof, it is readily apparent that the possibility of any water in the fuel wetting the filter element and freezing to clog the filter is minimized. Moreover, any water entrained in cold incoming fuel is collected in chamber 50 and its freezing therein will not clog the port 38 thereby avoiding fuel line freeze up during engine shutdown.

Since, according to this invention, the ported abutment 42 is positioned adjacent the lower edge of the chamber 50 and below ported abutment 38, the opening of drain plug 36 removes the water and heavy impurities without interfering with the flow from supply conduit 16 to discharge conduit 18. In this regard, it will be noted that the bottom wall 54 of the chamber 50 slopes toward the ported abutment 42 so that substantially all the water and other contaminants which are heavier than the fuel being filtered may be drained from the filter.

From the foregoing, it will be apparent that this invention provides a throwaway filter cartridge suited for mounting on a vertical mounting base through the use of a ported abutment communicating with the upper exit chamber and a pair of ported abutments disposed laterally and vertically with respect to each other communicate with the entrance chamber of the cartridge whereby the lower one of the ported abutments serves as a drain port for the heavier contaminants entrained with the fuel to prevent fuel line freeze up and provide a filter cartridge from which water may be drained while the engine is running.

As will be apparent to persons skilled in the art, various modifications, adaptions and variations of the foregoing specific disclosure can be made without department from the teachings of the present invention.

I claim:

1. A throwaway fuel oil filter cartridge suited for installation on a supporting base comprising a sealed housing and a liquid-permeable filter element within the housing dividing the interior thereof into vertically disposed entrance and exit chambers adjacent the bottom and top walls thereof, respectively, said housing having a base wall overlying the ends of said entrance chamber and said exit chamber, said basewall providing abutment means having laterally and vertically offset bearing portions engageable with the supporting base and effecting lateral stability of said cartridge thereon, said laterally offset bearing portions of said abutment means being ported to provide communication with said entrance chamber and said exit chamber including a pair of ports communicating with said entrance chamber, said last mentioned ports being laterally and vertically offset relative to each other.

2. The throwaway filter cartridge of claim 1 wherein the bottom wall of said cartridge is sloped toward the lowermost of said ports.

3. The throwaway filter cartridge of claim 1 wherein the lowermost of said ports is disposed completely below the other of said pair of ports communicating with said entrance chamber.

4. The throwaway filter cartridge of claim 3 wherein said abutment means comprise spaced noncoaxial ported abutments forming a tripod mount for the cartridge.

* * * * *